United States Patent [19]

Rowat

[11] Patent Number: 4,816,266

[45] Date of Patent: Mar. 28, 1989

[54] PROCESS FOR PRODUCTION OF A CULTURED TOFU AND PRODUCT PRODUCED THEREFROM

[76] Inventor: Steven Rowat, 62 Renfrew Avenue, Ottawa, Ontario, Canada, K1S 1Z5

[21] Appl. No.: 64,823

[22] Filed: Jun. 19, 1987

[51] Int. Cl.[4] .......................... A23L 1/20; A23C 9/13
[52] U.S. Cl. .......................... 426/46; 426/52; 426/61; 426/573; 426/634; 426/656
[58] Field of Search .................. 426/34, 36, 42–44, 426/46, 49, 51–52, 61, 573, 582, 583, 634, 656

[56] References Cited

U.S. PATENT DOCUMENTS

| | | | |
|---|---|---|---|
| 3,096,177 | 7/1963 | Ariyama | 426/46 |
| 3,950,544 | 4/1976 | Fridman | 426/46 |
| 3,982,025 | 9/1976 | Hashimoto et al. | 426/46 |
| 4,645,681 | 2/1987 | Sugisawa et al. | 426/634 |
| 4,664,930 | 5/1987 | Moriya | 426/634 |

FOREIGN PATENT DOCUMENTS 0023747  2/1983  Japan ........................ 426/46

*Primary Examiner*—Marianne Cintins
*Attorney, Agent, or Firm*—Bauer & Schaffer

[57] ABSTRACT

A process for the preparation of a novel cultured tofu is disclosed. Soybean curd (tofu) is mixed with a starter of bacteria commonly used in forming animal-milk yogurt and sheared such that the resultant is a viscous liquid without visible graininess which when incubated at temperatures appropriate to the maximum growth of the bacteria will yield a product with advantages over the original curd including increased shelf-life; improved convenience of use; improved taste and digestibility; and improved nutritional value.

9 Claims, No Drawings

PROCESS FOR PRODUCTION OF A CULTURED TOFU AND PRODUCT PRODUCED THEREFROM

GENERAL BACKGROUND

Soy protein as a basic food has been the subject of intensive research in the Orient for many hundreds and perhaps much more than a thousand years; to date the result of that research is still most commonly "soybean curd"—tofu—and tofu is part of the daily diet of over one billion people*, and is now rapidly spreading in the West where it is presently available in virtually all major population centers, usually even with a selection of competing brands.

*Shurtleff & Aoyagi, *TOFU & SOYMILK PRODUCTION, The Book of Tofu Volume Two,* Soyfoods, 1979, p. 8.

Use of tofu as a basic staple has timely advantages because of these present considerations:

(a) high heart-attack rates in Western society associated with high fat/cholesterol input;
(b) health disadvantages of overweightness associated with high caloric input;
(c) health hazards associated with eating foods high on the food-chain, i.e., higher concentrations of toxic residues in animal products relative to plant;
(d) worldwise competition for depleting resources of food and arable land;
(e) allergies and intolerances associated with animal-milk consumption, including lactose intolerance.

All of the above make tofu an attractive food:

(a) no cholesterol and very little fat, almost all of it poly-unsaturated (the preferred form for digestion);
(b) very low calorie-to-protein ratio;
(c) as it is a plant-food it will commonly contain only a small fraction of the contaminant levels of an animal food source; and as it is a plant-food it is more commonly produced under "organic" growing conditions than animal foods: "organically-grown" soybeans are not infrequently used in commercial tofu-production; which leads to even lower toxicity levels;
(d) one unit-weight of soy-produce a unit weight of comparable beef protein[2]: it is both cheaper to produce than animal protein and more appropriate as a long-term solution to world food needs;

[2]Shurtleff & Aoyagi, *THE BOOK OF TOFU,* Autumn Press, 1975, p. 15.

(e) soy as a substitute for milk products is generally acceptable as a nutritionally sound non-allergy-causing alternative.

SOME PROBLEMS WITH TOFU

Nonetheless the inventor, while spending a year producing tofu on a small commercial scale by the traditional Japanese method, and who had been led to the food through its advantages over existing foods, especially—for the inventor—(a), (c), and (e) above, discovered through intimate contact with the daily production and use of the product, and with its buyers, that certain disadvantages existed in the present situation, which were as follows: while it is reported that in the Orient the great majority of tofu is consumed the day it is made[3], in North America the pattern is for consumers to purchase weekly (or less often), and refrigerate. Since the tofu is only accidentally bought the day it is made (in most cases), most tofu available for use from a refrigerator is several days old at least; often over a week. But tofu is an excellent breeding-ground for a variety of micro-organisms[4]; even if it has been refrigerated properly after production and handling under very sanitary conditions it will need re-cooking within four or five days. And even fresh (cold) tofu is likely to be cooked or warmed by the consumer, to whom its high water-content (cold water) renders it unpalatable and hard to digest. Thus tofu does not have the convenience factor associated with animal-milk products; and further the spoilage which frequently occurs, or "souring", while not dangerous and easily dealt with by re-cooking, often becomes a stated reason why first-time buyers will not re-purchase the product.

[3,4,5]Shurtleff & Ayoagi, Op.Cit,... *Volume Two,* p. 23; pp. 107–112; p. 242; respectively.

OTHER FACTORS LEADING TO THE PRESENT INVENTION

As the inventor was one to whom animal-milk products were allergy-causing, he was also making at this time soymilk yogurt; i.e. soymilk curdled with acid-forming bacteria commonly used in the formation of animal-milk yogurt; in this case a commercially available mixture of *Lactobacillus bulgaricus, L. yoghourtii, L. acidophilus,* and *Streptococcus thermophilus,* in order to obtain a non-animal source for these bacteria, which have been long recognized (notably acidophilus[5]) as being capable of living in the human digestive tract, where they produce beneficial effects, including B-vitamins. However the soymilk yogurt being found to have an effect similar to soymilk in one disturbing way (severe flatulence, which has been the subject of numerous patent disclosures, not only for soybeans and soymilk but for soymilk yogurt (Fridman, U.S. Pat. No. 3,950,544), and which the inventor likes to speculate may have been the original reason for the invention of tofu[6] in mainland China in reportedly 164 A.D., since the problem can be so annoying) the inventor thought to blend a small amount of soy yogurt as starter into a freshly produced tofu curd, in the hope that it would grow there, both to give a source for yogurt bacteria independent of soymilk, and to preserve the tofu; an extra-powerful high-speed cutter machine was on hand and a very viscous high-density smooth liquid was produced; then incubated. The unexpected result was that not only did the bacteria grow well there, but the combination of the shearing and the growth produced changes in the taste, apparent digestibility, spreadability, overall convenience, and shelf-life, such that the inventor, after repeated trials, decided that a new food had been produced and began to offer it to his customers, several of whom began asking for it by name on a regular basis. The new product has a unique taste (U.S. Pat. Nos. 3,944,676, Fridman, 3937,843 Osaka et al refer to the accepted result that lactic-acid bacteria are useful in reducing unpleasant "bean taste" associated with soy products); good spreadability (it is successfully useable as a sandwich spread or salad-dressing or mayonnaise-like dressing: see U.S. Pat. No. 3,982,025 Hashimoto et al for a discussion of the importance of spreadability in promoting the use of soy protein, and of the problems of producing such a spread without graininess); keeps over two weeks at normal household refrigeration temperatures without spoilage or any loss of attractiveness (and according to some users it improves with age, through the further growth action of the acid-producing bacteria, which adds to the "tanginess" and helps to balance the bean taste); and is especially convenient both for non-refrigeration uses (like sandwiches to be kept many hours at room temperature, particularly in travel situations) and for simple meal preparation in the kitchen, since it is used without cooking. (The combination of the slight aeration produced by the shearing and and bacterial growth processes with the product's spreadability mean that it rises from refrigeration to room temperature much more quickly than tofu in most preparation scenarios, and hence rarely if ever needs warming; and can be used in conjunction with hot foods such as rice or soups to quickly bring them to a median palatable eating temperature). As with animal-milk or soymilk yogurt, a small quantity of the preceding batch can be used as starter for the subsequent.
[6]Ibid, page 129. Most of the flatulence-causing complex sugars are discarded in the whey.

Although previous patents have included acidophilus and similar bacteria to produce "acidophilus soymilk" (Kellog, Can. Pat. No. 357,561), and as an agent in the original curding of the soymilk in order to produce soybean curd and "soy cheese", these processes involve addition of the culture to soymilk, not to tofu (Ogasa et al, U.S. Pat. No. 4,303,678; Fridman, U.S. Pat. No. 3,944,676; Hashimoto et al, U.S. Pat. No. 3,982,025), where it is useful as the curding agent; in Hashimoto and Ogasa the product is then heat-treated (which kills the bacteria); in Fridman the product is separated by gravity and centrifuge from its whey, or heat-treated to "harden"; thus the existence of the bacteria in the final product is not a priority and not assured. To the inventor's knowledge and understanding there has as yet been no publication of or use of a process involving adding live nutritionally important bacteria to the soy curd itself.

DESCRIPTION OF THE INVENTED PROCESS

Two types of the inventor's novel cultured tofu have been developed, and are made under the designations (1) "soft style" and (2) "firm style". First the production of (1) will be described:

Prepare or obtain starter culture consisting of soymilk curded into yogurt with acid-forming bacteria normally used for animal-milk yogurt production; for this description prepare starter by taking freshly-made soymilk which has been extracted from soy mash cooked at at least 100° C. for at least 10 minutes and cooled to below 40° C., add bacteria culture of *Lactobacillus bulgaricus, L. yoghourtii, L. acidophilus,* and *Streptococcus thermophilus*[7]; culture 3–5 hours at approximating 40° C. or until set. Amount of starter culture to be made shall be approximating 7% by weight of the weight of tofu curd to be processed (wet weight). The percentage of starter culture—as in animal-milk yogurt product—may range dependent on the intended incubation temperature and time; characteristically between 4 and 10% of the tofu.
[7]This culture was a commercially-available mixture intended for use with animal-milk products. Shurtleff, Ibid., pp. 242-4, reports that the Lactobacillus strains grow best at relatively high temperature (37°–47° C.), and Streptococcus at a lower temperature (22°–44° C.); and that all will die off rapidly over 48° C. He further reports on a study by Mital and Steinkraus (1974) showing that *L. acidophilus* grew better in soymilk than cow's milk, *L. bulgaricus* grew worse, and *S. thermophilus* slightly worse (the difference was small). 5 other Lactobacillus strains are all reported to have grown better in soymilk than in cow's milk. The inventor believes that attention to both the literature and experimentation will allow the present process to be carried out at temperatures and incubation times which may differ but will be specific to each bacteria type or combination of types; producing resultants with slightly different taste and acidity characteristics.

Obtain tofu made by either the Japanese or Chinese method or some combination; one skilled in the art understands that the water-content of tofu varies from batch to batch and method to method, dependent on the type of beans, the type of coagulant, and the type of straining, pressing, and forming processes employed. Thus the water-content of the food produced, on which depends its firmness and spreadability, will be a combination of the just-listed factors in conjunction with the following: allow the tofu curd to drain for a number of minutes: more for the "Chinese style" ($CaSO_4$ coagulant) which has a higher water content. (The weight % of starter-culture to curd can also be varied above or below the 7% stated average in order to vary the consistency of the final product; this method will produce taste changes as well, since the soymilk yogurt adds a slight sweetness and "beanyness" in proportion to its inclusion.)

Preferably with the curd between 25° and 30° C. (temperature above approximating 35° C. runs the risk of allowing the to-be-described shearing process to raise the temperature of the whole to above 48° C., which risks killing the culture) place both curd and starter into a high-speed cutting machine capable of maintaining approximately 7,000 RPM shaft-rotation speed while causing a vortex action in the preparation and the preparation to liquify such that no "graininess" or small particles are visible in the final product. The process has been carried out both sterile (i.e. with containers and implements rinsed in boiling water prior to use) and non-sterile ("clean"); no significant difference was observed, and the non-sterile method is recommended for simplicity and is presently in use. Small, medium, and large scale cutters can be used as follows: small (0.75 liter): a "good-quality" home blender such as a Philips ® 14-speed (720 watts); medium (2 liter): a Vitamix ® 3600 (860 watts); large (25 liter): a Hobart VCM 25 ® (5 h.p.; 3-phase). Graininess in the product would indicate inadequate shearing due to too-slow bladespeed; this has been observed to lead to quick spoilage of the product, presumably because the undesirable growth organisms present in the curd[8] grow quickly in the incubation period when not in close contact with the acid-producing starter culture which would otherwise inhibit their growth.[9] Graininess occurred on the lower speed setting of the Hobart VCM 25 ®, stated as 3,000 RPM, while not at the higher speed setting, stated as 7,000 RPM. Actual speed of the blades will be lower than the rated amount due to the exceptional viscosity of the preparation. Graininess also occurred on a less-powerful home blender; 450 watt. Approximate times to achieve liquification of a load on the Philips ® was 1 minute, on the Vitamix ® was 45 seconds, and on the Hobart ® was four minutes. If the preparation is very warm to start (over 35° C.) it should be monitored as to temperature to ensure that at no time does the temperature rise above 48° C.
[8]Ibid, p. 107. Spores of many bacteria are not killed by standard cooking procedures.
[9]Similarly it is best to fill the incubating containers completely, so that the product touches the underside of the lid, i.e., so that no or minimal air is included. Otherwise, especially if the curd is obtained from an uncontrolled source and is already inadvertently innoculated with undesirable bacteria, slight souring can occur in the top layer, where the air contacts the product.

It should be noted that any machine that can bring the preparation to the required "non-grainy" state without overheating or otherwise interfering with the growth of the bacterial culture is potentially suitable; Quadro ®, Reitz ®, and Fitzpatrick ® companies, and probably others, produce machines which force materials through fine wire meshes, which may suffice; though one sample examined by the inventor of tofu puree from a Quadro ® machine appeared too grainy; but finer screens or greater driving forces or configurations of the driving hammer/screw may succeed. As well a homogenizer such as is used to homogenize milks (including soymilk) might achieve the necessary reduction in particle size; however these machines are designed for liquids (to the inventor's knowledge) and even if usable may require extensive modification.

After shearing as described, place contents into clean plastic containers and incubate at approximating 40° C. for 3-5 hours; i.e., until growth of the bacteria is evident by acidification of the taste, slight extra curding (solidity), and bubble formation. Refrigerate. The cooled finished product will have spreading characteristics resembling slightly aerated cream cheese.

Type (2): "firm style": Obtain tofu curd which is "Japanese Style", i.e., firmer curd, made with Nigari or McCl$_2$ solidifier. Drain longer than described in (1), so that more water leaves the curd, i.e., for half an hour or more.

For starter use 7% by weight, starter to curd, of a previous batch of either "soft" or "firm" style. Proceed identically to (1) above, except that inclusion of small amounts of water (or soymilk if desired) may be necessary to achieve a vortex action of the preparation in the cutting machine and hence liquification. Add only the minimum amount of water or soymilk necessary to achieve such vortex flow.

As in (1) above place in containers, incubate identically, refrigerate. Cooled finished product will have approximately the consistency of ricotta cheese.

Process (1) above for obtaining "soft style" may equally well be followed using a previous batch as starter as in (2); soymilk and/or water will be added as desired to control taste and consistency. As in animal-milk yogurt preparation, after several generations of use the bacteria will need to be replaced from a controlled external source (i.e. commercial supplier) in order to maintain the balance and vigour of the bacteria strains.

The foregoing is by way of example only and the invention should be limited only by the scope of the appended claims.

The embodiments of the invention in which an exclusive property or privilege is claimed are defined as follows:

1. A process for the production of a cultured Tofu comprising the steps of:
   (a) securing a starter culture of soymilk yogurt;
   (b) inoculating Tofu with the starter-culture of step (a);
   (c) shearing the inoculated Tofu at a temperature sufficient to maintain bacteria in the inoculated tofu in the viable range and for a period of time sufficient to obtain a homogenous viscous liquid;
   (d) incubating said homogenous viscous liquid at a temperature and for a period of time sufficient to obtain the cultured Tofu.

2. A process for the preparation of a cultured Tofu according to claim 1, said starter-culture having been prepared with bacteria selected from the group consisting of: *Lactobacillus bulgaricus, L. yoghourtii, L. acidophilus,* and *Streptococcus thermophilus*.

3. A process for the preparation of a cultured Tofu according to claim 1, said step of shearing being carried out in a rotary-blade cutting machine.

4. A process according to claim 1, in which in step (c) a viscous liquid with no visible graininess is obtained.

5. A process according to claim 2, in which the amount of starter-culture is in the range of about 2% to 10% of the weight of the Tofu.

6. A process according to claim 2, in which the temperature during shearing at no time rises above 48° C.

7. A cultured Tofu prepared according to the process of claims 1, 2, or 3.

8. A cultured Tofu prepared according to the process of claim 4.

9. A cultured Tofu prepared according to the process of claims 5 or 6.

* * * * *